March 9, 1943.     S. SLAUGHTER     2,313,591
SIDE DELIVERY WHEELBARROW
Filed Aug. 12, 1942     3 Sheets-Sheet 1

SAMUEL SLAUGHTER,
INVENTOR.

BY Donald E. Windle,
ATTORNEY.

March 9, 1943. S. SLAUGHTER 2,313,591
SIDE DELIVERY WHEELBARROW
Filed Aug. 12, 1942 3 Sheets-Sheet 2

SAMUEL SLAUGHTER,
INVENTOR.
BY Donald E. Windle,
ATTORNEY.

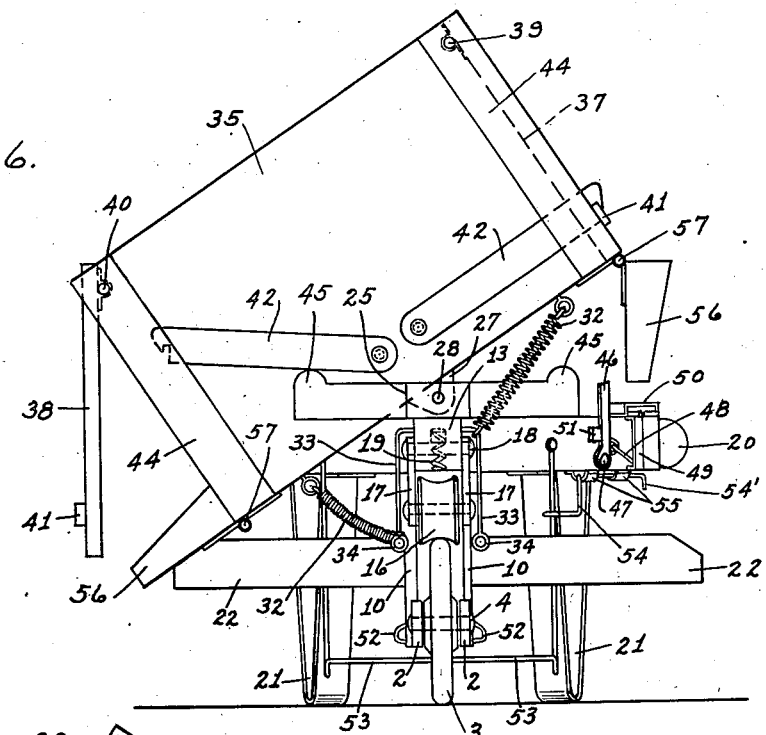
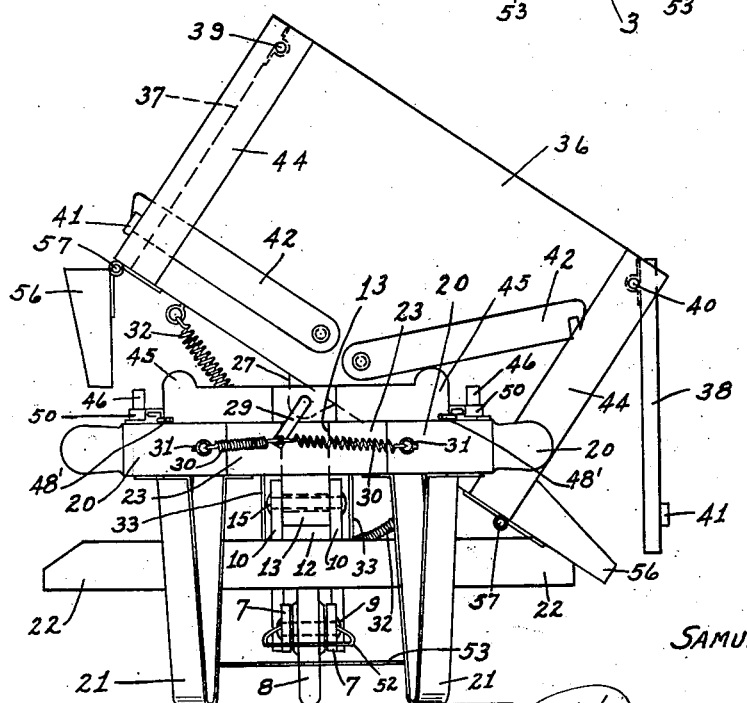

Patented Mar. 9, 1943

2,313,591

UNITED STATES PATENT OFFICE 2,313,591

SIDE DELIVERY WHEELBARROW

Samuel Slaughter, Richmond, Ind., assignor of one-half to Verlin T. Brown, Richmond, Ind.

Application August 12, 1942, Serial No. 454,622

8 Claims. (Cl. 298—2)

The principal object of the invention is the provision of a wheelbarrow which is adapted to deliver material at either side thereof without the wheelbarrow being turned on its side.

Another object of the invention is the provision of a body rockably mounted on an undercarriage and adapted to be tilted to either side to accomplish the dumping thereof.

Another object of the invention is to provide an undercarriage in which wheels are mounted in tandem with one wheel being adapted to swivel with relation to the other.

Another object of the invention is to provide hinged doors at each side of the tiltable body operable for movement into an open position for dumping the load when the body is tilted toward either side.

A further object of the invention is to provide means automatically releasing the hinged doors when the body is tilted and to maintain the doors in closed condition when the body is in a normal position.

A further object of the invention is to provide means for automatically returning the body to its normal position after the contents thereof have been dumped.

A still further object is to provide a side delivery wheelbarrow which is comparatively simple of construction, which is strong and durable, and which is efficient and positive in its operation.

Other objects and advantages of the invention will suggest themselves in the course of the following description, and that which is new will be pointed out in the appended claims.

The most satisfactory manner for carrying out the principles of the invention in a practical and efficient manner is shown in the accompanying three sheets of drawings, in which:

Figure 6 is a front elevational view similar to that shown in Figure 5 except the body is shown tilted and with one of the doors thereof being in open position and with the respective chute being in extended position.

Figure 7 is a rear elevational view of the wheelbarrow showing the body in tilted position.

Like characters designate like parts throughout the several views.

Figure 1:
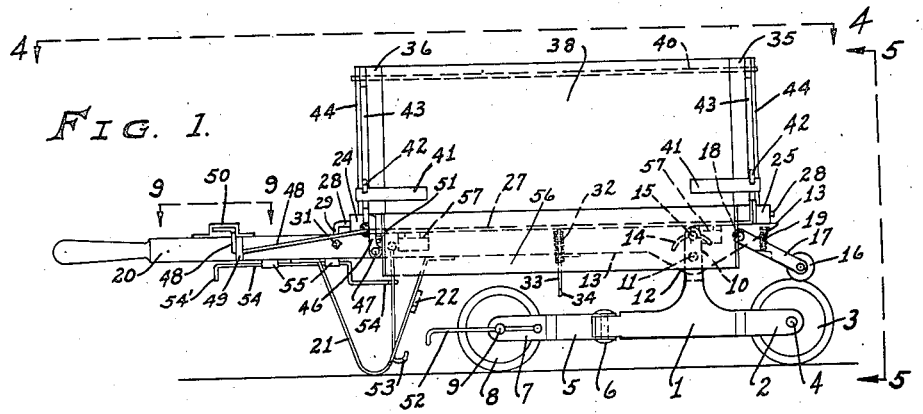
Figure 1 is a right side elevation of a wheelbarrow embodying the principles of the invention, and showing the body thereof in its normal position.
Figure 2:
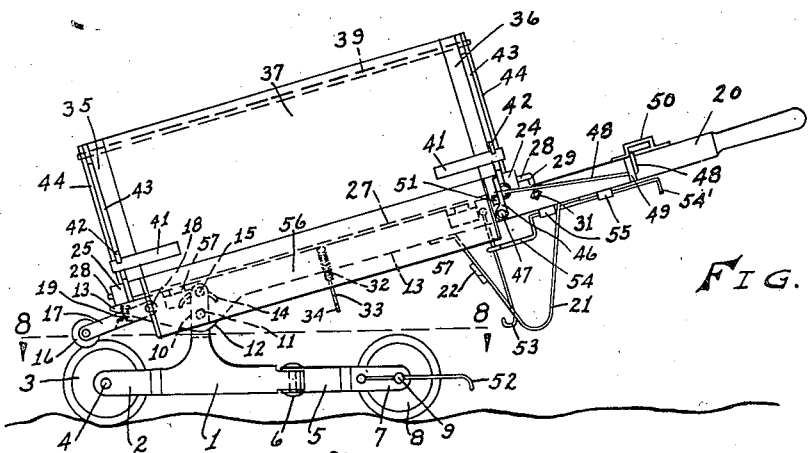
Figure 2 is a left side elevation of the wheelbarrow in operative condition with both wheels thereof contacting the ground.

In order that the advantages of the invention may be more fully understood and appreciated, I will now take up a detailed description thereof in which the same will be more fully described.

Referring now to the drawings in detail, numeral 1 designates the wheel mounting having the forwardly extending yoke 2 in which the wheel 3 is journaled by means of the axle pin 4. A rearward extension 5 is pivotally secured to the wheel mounting 1 by means of the vertically positioned pin 6 with the yoke 7 being formed at the rear end of the extension 5 in which the trailer or tandem wheel 8 is journaled by means of the axle pin 9.

A pair of upwardly extending guides 10 are formed on the mounting 1 and have a pin 11 extending therethrough and through the lower extension 12 of the frame member 13 and pivotally connecting the wheel mounting to the frame. An arcuate slot 14 is formed through the frame 13 through which the upper ends of the guides 10 are connected by means of the pin 15.

An idler wheel 16 is pivotally supported between yoke members 17 at the forward end of the frame by means of the pivot pin 18, and is held in constant contact with ground wheel 3 by means of the compression spring 19. The idler wheel is provided to prevent the body from undue tipping forwardly should the wheel 3 strike an upwardly projecting solid object.

A handle 20 is rigidly secured to each side of the longitudinal frame member 13 and extends rearwardly therefrom with a supporting leg 21 being secured to the underside of each handle member. A bar 22 extends across the forward faces of the legs 21 and has each end thereof chamfered, the purpose of which will be hereinafter set forth.

A transverse bar 23 extends between the handles 20 at the rear end of the body and supports the rear bearing member 24. A front bearing member 25 is secured to the forward end of the longitudinal frame member 13 forwardly of the body.

The body has a bottom or floor 26 to which the rock beam 27 is secured, the same extending longitudinally of the body at the transverse center thereof. The shaft 28 extends longitudinally of the rock beam 27 with the forward end of the shaft being journaled in the front bearing 25 and the rear end thereof being journaled in the rear bearing 24. The rear end 29 of the shaft is formed at substantially a right angle to the shaft and extends downwardly therefrom. A pair of tension springs 30 are secured to the lower end of the shaft 29 and extend oppositely therefrom with their outer ends being secured to their respective handles 20 by means of eye bolts 31, the purpose of the springs being hereinafter more fully set forth.

Attached to the under side of the bottom 26, by means of eye bolts or other suitable means, and located one on each side of the rock beam are the tension springs 32 with the lower end of each being freely secured on a respective downwardly extending rod 33. The upper end of each rod is rigidly secured to a side of the frame 13 and with a stop portion 34 being formed at the lower end thereof to prevent the inner or lower ends of the springs 32 from becoming disengaged therewith.

The body has front and rear ends 35 and 36 respectively and left and right sides 37 and 38 respectively with the sides being hinged at their upper portions on the left and right rods 39 and 40 respectively. Latch keepers 41 are secured at the front and rear of each of the side members and are engaged by the pivoted latch bars 42 operating in guides 43 formed by the members 44 being spaced from the ends of the body when the body is in normal position, or when the body is in dumping position the dumping side latch bars are disengaged from the respective latch keepers by means of cams 45 as the body is tilted, which permits the side to swing open as shown in Figures 6 and 7.

Figure 10:
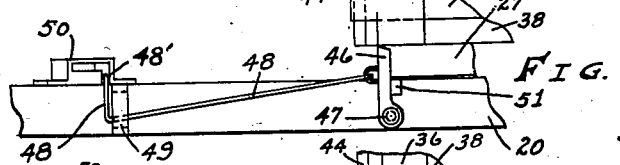
Figure 10 is a right side elevational view of the operating mechanism, taken from line 10—10 of Figure 4, and showing the body-locking member in engaged position.
Figure 11:
Figure 11 is a side elevational view of the operating mechanism similar to that shown in Figure 10 except the locking lever is shown in disengaged relation with the body.

In order to maintain the body in a normal position except when dumping is desired, I have provided a pivoted post member 46 at the rear end of each side of the body, with each of the post members being pivotally secured to a handle member 20 by means of a rivet or bolt 47. Each of the pivoted post members is operable by means of an operating rod 48 extending through a guide 49. The end 48' of the operating rod extends over the top of the handle and through the keeper member 50 which has an inverted L-shaped slot formed therethrough as shown more clearly in Figures 10 and 11.

A stop member 51 is secured on each of the handles 20 and is located forwardly of the pivoted post member 46 to provide a forward limit to the movement of the post member.

It is desirable at times, especially when pulling instead of pushing the wheelbarrow, to raise the tandem wheel 8 free of the ground. In order to raise the wheel 8, I have provided a loop 52 rigidly secured to each side of the yoke 7 and extending rearwardly therefrom and across the rear side of the wheel 8. I have provided a hook member 53 swingably secured to each handle 20 with an operating rod 54 extending rearwardly therefrom with the rear end 54' thereof being turned to form a handle, and with the operating rod being slidably secured under one of the handles by means of guide members 55.

A hinged chute member 56 is hingedly secured longitudinally of the lower edge of each side of the body by means of hinges 57. When the body is tilted as for dumping, the chute on the lowered side strikes the chamfered portion of the respective end of bar 22 which causes the chute to be directed outwardly as shown in Figures 6 and 7. The chamfered portion of the bar 22 provides a stop for the chute which in turn limits the tilting action of the body.

Stops 58 are secured in each corner of the body to prevent the hinged sides from swinging into the body.

Figure 3:
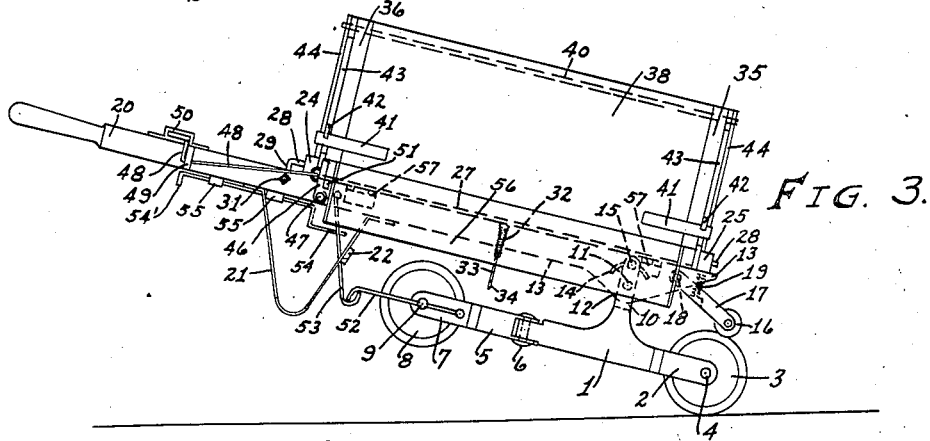
Figure 3 is a side elevation showing the tandem wheel in lifted condition for rearward movement of the wheelbarrow.
Figure 9:
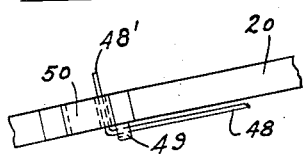
Figure 9 is a partial top plan view of the operating mechanism, taken from line 9—9 of Figure 1.
Figure 4:
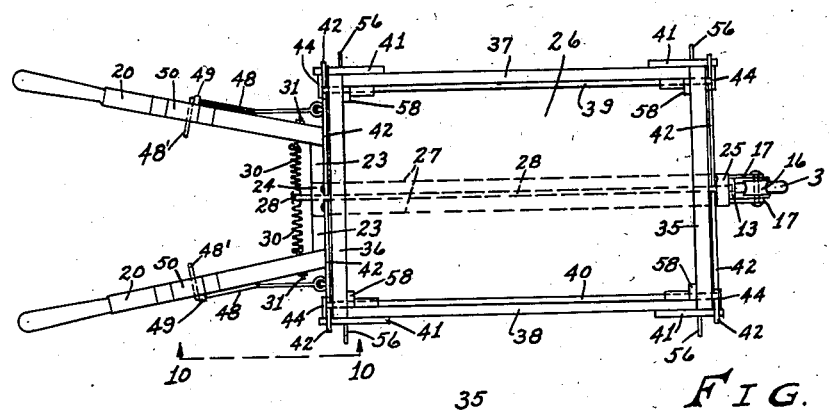
Figure 4 is a plan view of the wheelbarrow taken from line 4—4 of Figure 1.

In the operation of the wheelbarrow, the same is pushed in the same manner as the conventional wheelbarrow. When it is desired or necessary to pull the wheelbarrow, the operating rod 54 is moved forwardly, swinging the hook 53 slightly forward of the loop 52, after which the handles are raised. As the hook 53 is raised, the same engages the loop 52 and raises the rear or tandem wheel 8 free of the ground as shown in Figure 3.

Figure 5:
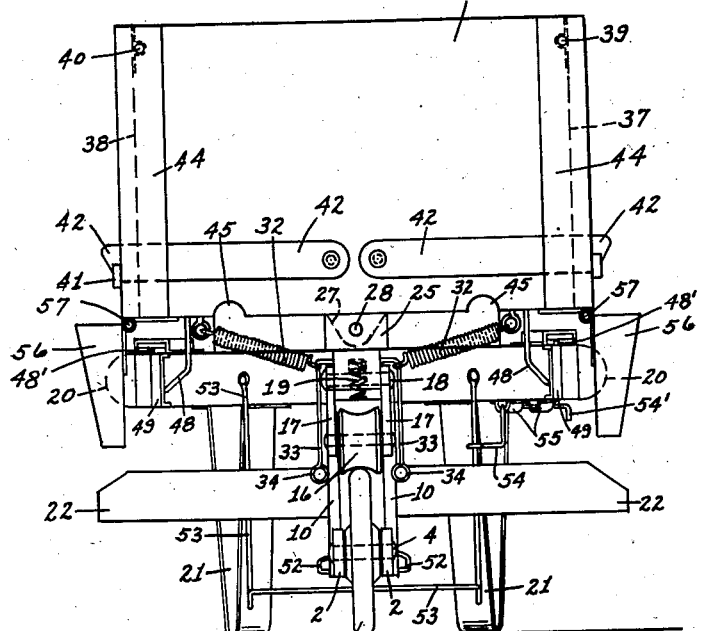
Figure 5 is a front elevational view of the wheelbarrow taken from line 5—5 of Figure 1 and showing the body thereof in normal position.
Figure 8:
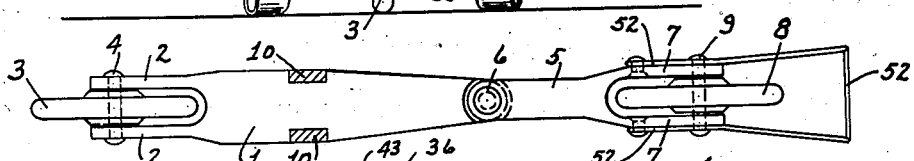
Figure 8 is a sectional-plan detail of the undercarriage taken from line 8—8 of Figure 2.

When it is desired to dump a load of material to one side or the other, the respective operating handle 48' is raised out of its notch which is formed in the member 50, and the rod 48 is then drawn rearwardly, the action of which disengages the respective hinged post 46 from contact with the under side of the body. A slight tilting action of the handles will cause the load to shift sufficiently in the body to tilt the body to the position as shown in Figures 6 and 7. As the body begins to tilt, the respective front and rear latch bars are disengaged from their latch keepers by contact with respective front and rear cam members 45. The disengagement of the latch bars 42 from the latch keepers 41 allows the side to swing open until the load is dumped from the body. After the load is dumped, the extended tension springs 30 and 32 exert the necessary pull to return the body to its normal position. As the open side member 38 returns to its normal position by gravity, the latch bars 42 engage the latch keepers 41 and maintain the side in closed position as shown in Figure 5. The operating rod 48 is then moved forwardly and the portion 48' thereof is moved downwardly into its notch, the action of which moves the pivoted post 46 into position under the body and prevents the body from being accidentally tilted. It is to be understood that it is not necessary to stop the movement of the wheelbarrow to disengage the pivoted posts 46 to permit the body to tilt and dump, and that the wheelbarrow may be kept in motion while dumping which is especially advantageous in spreading or directing the material in a row or in a form such as a form made for concrete. If the wheelbarrow is used for carrying coal and unloading the same into a cellar window or a coal chute, it is not necessary to raise the handles to dump the load as is required in the use of conventional wheelbarrows. It is only necessary to stop the wheelbarrow with one of its sides adjacent the opening and dump the load by the side-tilting action of the body.

In addition to the form herein shown and described, it is possible to modify the construction of the undercarriage to adapt the device for use with a power tractor or the like and to provide controls which will permit dumping by the operator thereof, and utilize the body for spreading materials along one side of the path of the vehicle.

It is to be understood that I am not to be limited to the exact form and position of the parts herein shown and described, but that minor changes may be made therein insofar as the changes may fall within the scope of the appended claims.

Having now fully shown and described the invention, what I claim, and desire to secure by Letters Patent of the United States, is:

1. A wheelbarrow comprising a main frame, a wheel mounting on which the frame is supported, a body, a longitudinally extending rock shaft secured to the under side of the body and journaled in the frame, means permitting tilting of the body toward either side of the frame, a door hinged at each side of the body and adapted for opening movement by the tilting action of the body, and latch means for automatically securing the doors in closed position.

2. A wheelbarrow comprising a main frame, a wheel mounting on which the frame is supported, a body, a longitudinally extending rock shaft secured to the under side of the body and journaled in the frame, means permitting tilting of the body toward either side of the frame, a door hinged at each side of the body and adapted for opening movement by the tilting action of the body, latch means for securing the doors in a closed position, and pivoted posts carried by the frame and engaging the body to prevent accidental tilting thereof, said posts being movable into a position for releasing the body.

3. A wheelbarrow comprising a main frame, a wheel mounting on which the frame is supported, a body, a longitudinally extending rock shaft secured to the under side of the body and journaled in the frame, means permitting tilting of the body toward either side of the frame, a door hinged at each side of the body and adapted for opening movement by the tilting action of the body, latch means for securing the doors in a closed position, and pivoted posts carried by the frame for engaging the body to prevent accidental tilting thereof and movable into another position for releasing the body.

4. A wheelbarrow comprising a main frame, a wheel mounting on which the frame is pivotally supported for longitudinal pivotal movement, a body rockably supported on said frame, a front wheel journaled on the front end of the mounting, an extension pivoted at the rear of the mounting for horizontal swinging movement, a rear wheel journaled on said extension, a handle projecting rearwardly from the frame, and means carried by the handle for engaging the extension to connect the mounting to the frame and providing a means for raising the rear wheel from the ground.

5. A wheelbarrow comprising a main frame carried on a wheel mounting and pivoted with relation thereto, a front wheel journaled on the front end of the mounting, a rearward extension pivoted at the rear of the mounting and carrying a second wheel, means provided on the frame engaging the pivoted rearward extension and lifting the same free of the ground when the wheelbarrow is in operative condition.

6. In a wheelbarrow having a tiltable body mounted on a frame, hinged sides having latch keepers secured thereto, latch bars pivotally secured to the ends of the body and engaging the latch keepers to maintain the sides in closed position when the body is in normal position and disengaging from the latch keepers during tilting motion of the body, and cam members operating the latch bars.

7. In a wheelbarrow having a tiltable body with sides hinged thereto, latch keepers secured to the hinged sides, latch bars cooperating with the latch keepers, cams operating the latch bars when the body is tilted, a hinged chute positioned on each side of the body, and means engaging the hinged chutes and projecting the same outwardly when the body is tilted.

8. In a wheelbarrow having a body adapted to tilt toward either side, hinged side members operable outwardly from the body, a chute member hingedly secured to each side of the body, means projecting the chutes when the body is tilted, with said means providing a stop and limiting the tilting movement of the body, and tension springs returning the body from its tilted position to its normal position.

SAMUEL SLAUGHTER.